United States Patent
Toyota et al.

(10) Patent No.: US 7,259,522 B2
(45) Date of Patent: Aug. 21, 2007

(54) LIGHTING METHOD, LIGHTING APPARATUS AND COMPONENTS USED THEREFOR

(75) Inventors: Makoto Toyota, Saitama (JP); Tatsuo Seki, Saitama (JP); Yasuhiko Fukunaga, Saitama (JP); Shuji Shikano, Tochigi (JP)

(73) Assignee: Moritex Corporation, Tokyo (JP)

( * ) Notice: Subject to any disclaimer, the term of this patent is extended or adjusted under 35 U.S.C. 154(b) by 0 days.

(21) Appl. No.: 10/941,101

(22) Filed: Sep. 15, 2004

(65) Prior Publication Data

US 2005/0062445 A1    Mar. 24, 2005

(30) Foreign Application Priority Data

Sep. 17, 2003   (JP) ............................. 2003-323991

(51) Int. Cl.
    *H05B 37/02*    (2006.01)
    *G09B 9/00*     (2006.01)
(52) U.S. Cl. ..................... 315/224; 362/800
(58) Field of Classification Search ............. 315/224, 315/291, 307; 362/800
    See application file for complete search history.

(56) References Cited

U.S. PATENT DOCUMENTS

| | | | | |
|---|---|---|---|---|
| 5,015,921 | A * | 5/1991 | Carlson et al. ............. | 315/208 |
| 5,144,117 | A * | 9/1992 | Hasegawa et al. ........... | 235/455 |
| 6,121,757 | A * | 9/2000 | Takahashi et al. ........... | 322/28 |
| 6,853,155 | B2 * | 2/2005 | Yamamoto et al. .......... | 315/291 |
| 6,888,454 | B2 * | 5/2005 | Kurose ........................ | 340/514 |
| 2003/0139888 | A1 * | 7/2003 | Burns .......................... | 702/63 |
| 2003/0226954 | A1 * | 12/2003 | Ohmi ........................... | 250/221 |
| 2004/0233144 | A1 * | 11/2004 | Rader et al. .................. | 345/82 |

FOREIGN PATENT DOCUMENTS

JP         2000-6466        1/2000

OTHER PUBLICATIONS

U.S. Appl. No. 10/806,178 to Toyota et al, Mar. 23, 2004.
U.S. Appl. No. 10/940,720 to Toyota et al, Sep. 15, 2004.

\* cited by examiner

*Primary Examiner*—Shih-Chao Chen
*Assistant Examiner*—Minh Dieu A
(74) *Attorney, Agent, or Firm*—Greenblum & Bernstein, P.L.C.

(57) ABSTRACT

A current to light emitting devices when an application voltage is at or higher than the lower limit voltage for lighting determined by the arrangement of the light emitting devices, and an identification circuit that outputs a current identification signal in accordance with an appropriate current for the lighting circuit when the application voltage is lower than the lower limit value for lighting, and the power supply comprises a driving power supply that applies a lighting voltage at or higher than the lower limit voltage for lighting, an identification power supply that applies an identification voltage at or lower than the lower limit voltage for lighting, a current setter that sets an appropriate current to be supplied to the lighting circuit based on the current identification signal outputted from the identification circuit.

20 Claims, 4 Drawing Sheets

| Appropriate Current $I_R$ (mA) | Voltage Drop Vc (V) | Identification Resistor 8 (kΩ) |
|---|---|---|
| 20 | 0.088 | 60 |
| 40 | 0.095 | 56 |
| 60 | 0.101 | 52 |
| 80 | 0.109 | 48 |
| 100 | 0.119 | 44 |
| 120 | 0.130 | 40 |
| 140 | 0.144 | 36 |
| 160 | 0.161 | 32 |
| 180 | 0.182 | 28 |
| 200 | 0.210 | 24 |

| Appropriate Current $I_R$ (mA) | Voltage Drop Vc (V) | Identification Resistor 8 (kΩ) |
|---|---|---|
| 20 | 0.1 | 52.80 |
| 40 | 0.2 | 25.30 |
| 60 | 0.3 | 16.13 |
| 80 | 0.4 | 11.55 |
| 100 | 0.5 | 8.80 |
| 120 | 0.6 | 6.96 |
| 140 | 0.7 | 5.66 |
| 160 | 0.8 | 4.67 |
| 180 | 0.9 | 3.91 |
| 200 | 1.0 | 3.30 |

| Appropriate Current $I_R$ (mA) | Voltage Drop Vc (V) | Identification Resistor 8 (kΩ) |
|---|---|---|
| 20 | 0.088 | 60 |
| 40 | 0.095 | 56 |
| 60 | 0.101 | 52 |
| 80 | 0.109 | 48 |
| 100 | 0.119 | 44 |
| 120 | 0.130 | 40 |
| 140 | 0.144 | 36 |
| 160 | 0.161 | 32 |
| 180 | 0.182 | 28 |
| 200 | 0.210 | 24 |

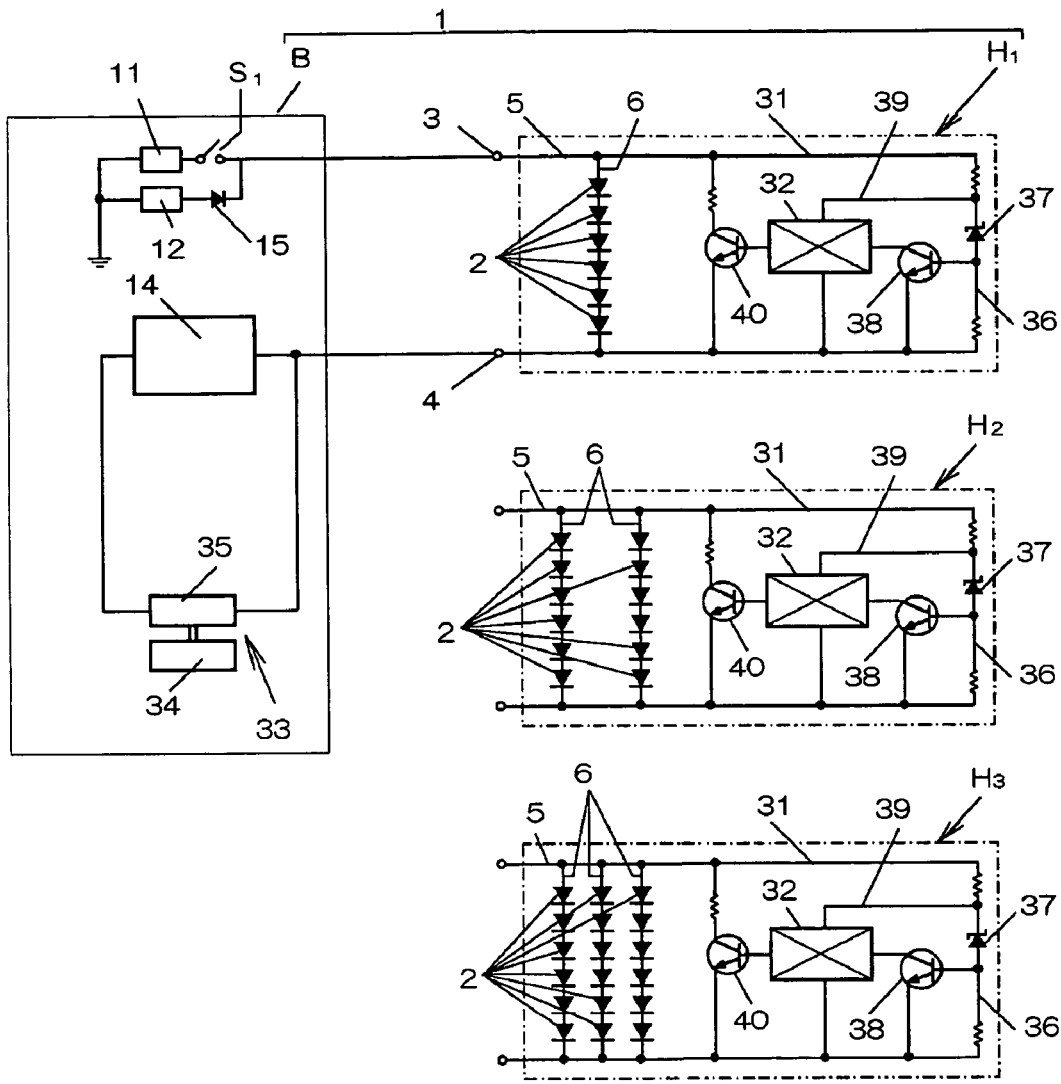

LIGHTING METHOD, LIGHTING APPARATUS AND COMPONENTS USED THEREFOR

BACKGROUND OF THE INVENTION

Field of the Invention

The present invention concerns a lighting method of connecting a lighting head having one or more light emitting devices arranged in an optional pattern to a power supply and lighting-up them, a lighting apparatus used for the method and components therefor.

In a case of connecting a lighting head having a number of light emitting devices, for example, light-emitting diodes (hereinafter sometimes referred to as LEDs) to a power supply, the electric power for the power supply is set so as to supply an appropriate current for flowing a rated current for lighting to individual LEDs from the power supply to the lighting head.

Recently, a power supply capable of controlling the current in accordance with the number of LEDs so that a rated current can be supplied to respective LEDs even in a case of connecting a lighting head capable of lighting individual LEDs respectively has been proposed (for example, refer to Patent Document 1; JP-A No. 2000-6466).

However, the power supply described above is adapted to control the current in accordance with the number of LEDs to be lit in a case of connecting a specified lighting head. In a case of using lighting heads of different specifications, the power supply can not control the current in accordance with specifications.

That is, lighting heads using lighting devices such as LEDs include versatile types and specifications such as connection methods of LEDs to the power supply circuit (for example, parallel or serial connection), quantity of LEDs used, and ratings of individual LEDs are different on every lighting heads, so that power supplies or current controllers have to be designed and manufactured in accordance with the lighting heads.

For example, as shown in FIG. 7, in a case where the rated current of individual LEDs 72 attached to a lighting head 71 is specified as 20 mA, it is necessary to supply a current to a power supply circuit 73 at a level of 20 mA, when six LEDs 72, 72 - - - are connected in series as shown in FIG. 7(a), at a level of 40 mA when such six LEDs 72, 72 - - - connected in series are further connected in parallel by two rows as in FIG. 7(b), and at a level of 60 mA when such serially connected six LEDs 72, 72 - - - are further connected in parallel by three rows as in FIG. 7(c).

In this case, since the resistance characteristic of LEDs 72, 72 - - - is not linear, each of the LEDs can not be lit at a rated current even when the driving voltage is controlled, so that current control is conducted in the power supply.

Accordingly, the power supply has been designed so far such that rated current can be supplied in accordance with the specification of each lighting head 71 and, while current control can be conducted according to the number of LEDs to be lit within a predetermined specification, no appropriate current control can be done for lighting heads of other different specifications.

Accordingly, in a case where a power supply of an identical rating can be used irrespective of different specifications of lighting heads 71, this can greatly save the trouble of designing and manufacturing power supplies and conducting stock control on every individual lighting heads 71 and greatly decrease the manufacturing cost and save the troubles of stock control.

SUMMARY OF THE INVENTION

In view of the above, the present invention intends to solve the technical subject of lighting individual light emitting devices of a lighting head connected with a power supply each at a rated current by using a power supplying of one identical rating irrespective of different specifications of respective lighting heads.

The foregoing subject can be attained in accordance with the present invention by a lighting method of connecting a lighting head having one or more light emitting elements arranged in an optional intended pattern to a power supply for lighting, which comprises outputting a current identification signal from the lighting head in accordance with an appropriate current determined by the arrangement of the light emitting devices during non lighting-up state of the light emitting devices and setting an appropriate current to be supplied to a lighting circuit based on an appropriate current identification signal and keeping the current flowing to the lighting circuit to an appropriate level by a lighting current control circuit during a lighting-up state of the light emitting devices.

The method of the present invention described above can be conducted by a lighting apparatus in accordance with the invention comprising;

a lighting head having a lighting circuit that supplies a current to light emitting devices when an application voltage is at or higher than a lower limit voltage for lighting determined by the arrangement of the light emitting devices, and an identification circuit that outputs a current identification signal in accordance with an appropriate current for the lighting circuit in a case when the application voltage is lower than the lower limit voltage for lighting, and a power supply having a driving power supply that applies a lighting voltage at or higher than the lower limit voltage for lighting to the lighting circuit during a lighting-up state of the light emitting devices, an identification power supply that applies an identification voltage lower than the lower limit voltage for lighting to the identification circuit during a non lighting-up state of the light emitting devices, a current setter that sets an appropriate current to be supplied to the lighting circuit based on the current identification signal outputted from the identification circuit, and a lighting current control circuit that keeps the current flowing to the lighting circuit during a lighting-up state of the light emitting devices to an appropriate current in accordance with the current setting signal outputted from the current setter.

According to the lighting method of the present invention, the appropriate current identification signal in accordance with the appropriate current determined by the arrangement of the light emitting devices in the lighting head is outputted in the non lighting-up state of the light emitting devices, and the value of the current to be supplied to the lighting head can be recognized based on the identification signal.

This can maintain the current supplied from the power supply to the lighting circuit during the lighting-up state of the light emitting devices to the appropriate current by the lighting current control circuit to light-up the individual light emitting devices at a rated current irrespective of the specification of the lighting head.

In this case, by the provision of the lighting circuit that supplies current to the light emitting devices when the application voltage is at or higher than the lower limit for lighting determined by the arrangement of the light emitting devices and the current identification circuit that outputs the current identification signal in accordance with the appropriate current for the lighting circuit when the application voltage is lower than the lower limit for lighting, the identification circuit operates during non lighting-up state of the light emitting devices in accordance with the voltage supplied from the power supply to output the current identification signal.

The identification circuit can be constituted, for example, by using an identification resistor having a different resistance value depending on the appropriate current or by using a micro-computer for encoding that outputs a current identification signal obtained by pulsating a current identification code which is different depending on the appropriate current.

Then, when a current identification signal is outputted from the identification circuit, an appropriate current to be supplied to the lighting circuit is set by the current setter.

In a case where an identification resistor is interposed in the identification circuit, the current setter is adapted to output a current setting signal in accordance with the current flowing through the identification resistor.

Further, in a case of using a micro-computer for encoding use in the identification circuit, the current setter reads a current identification code as the current identification signal by the micro-computer and sets an appropriate current with reference to an identification code-appropriate current conversion table.

Accordingly, this can provide an effect capable of maintaining the current supplied from the power supply to the lighting circuit to an appropriate current by the lighting current control circuit during the lighting state of the light emitting devices and capable of lighting-up individual lighting devices each at a rated current irrespective of the specification of the lighting head.

DESCRIPTION OF THE ACCOMPANYING DRAWINGS

Preferred embodiments of the present invention will be described in details based on the drawings, wherein FIG. 1 is a circuit diagram showing an example of a lighting apparatus according to the present invention;

FIG. 5 is a circuit diagram showing a further embodiment of the invention;

FIG. 6 is a table showing a relation between appropriate current and identification code.

DESCRIPTION OF PREFERRED EMBODIMENTS

The purpose of lighting-up individual light emitting devices connected to a lighting circuit each at a rated current irrespective of the specification of a lighting head has been attained by outputting a current identification signal in accordance with an appropriate current from the lighting head during non lighting-up state of light emitting devices.

Figures 1, 2:
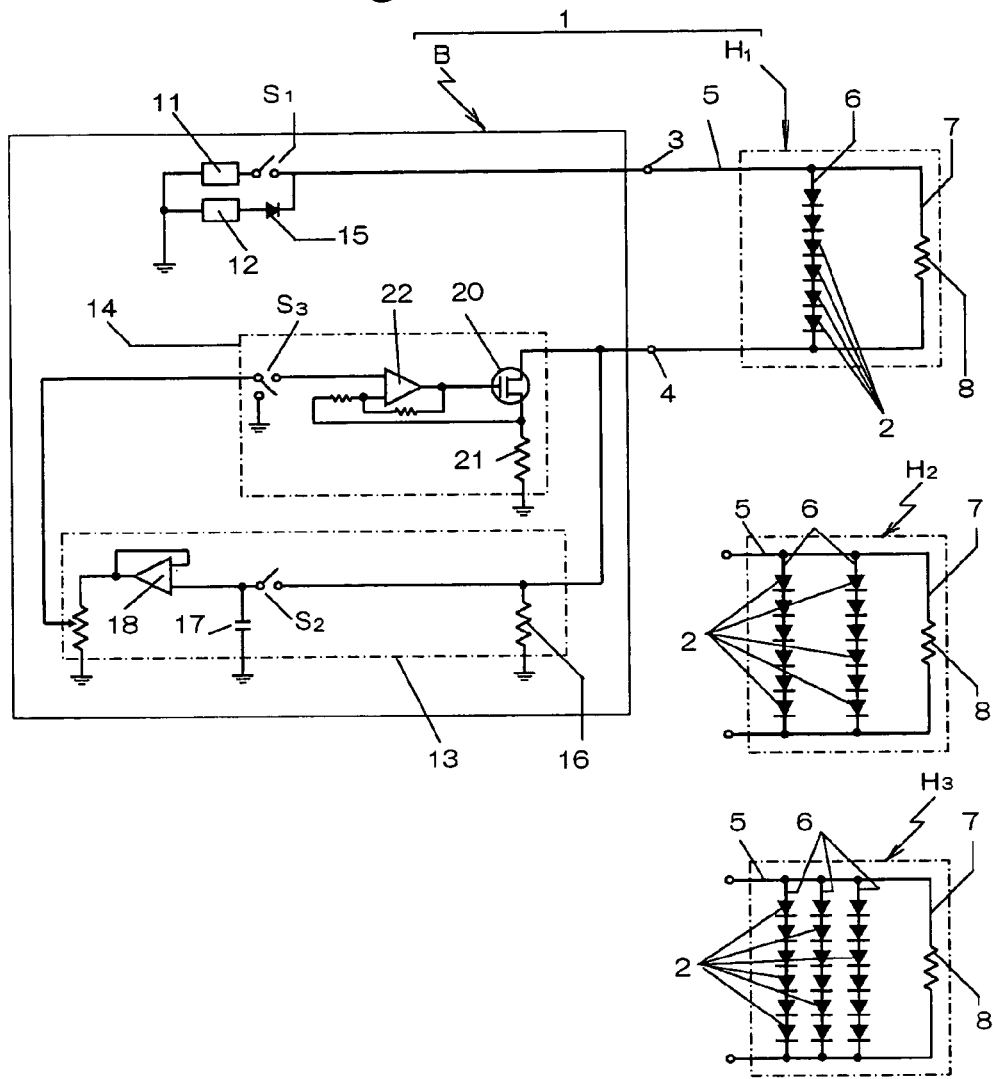
FIG. 2 is a table showing a relation between appropriate current and identification resistance.
Figures 3, 4:
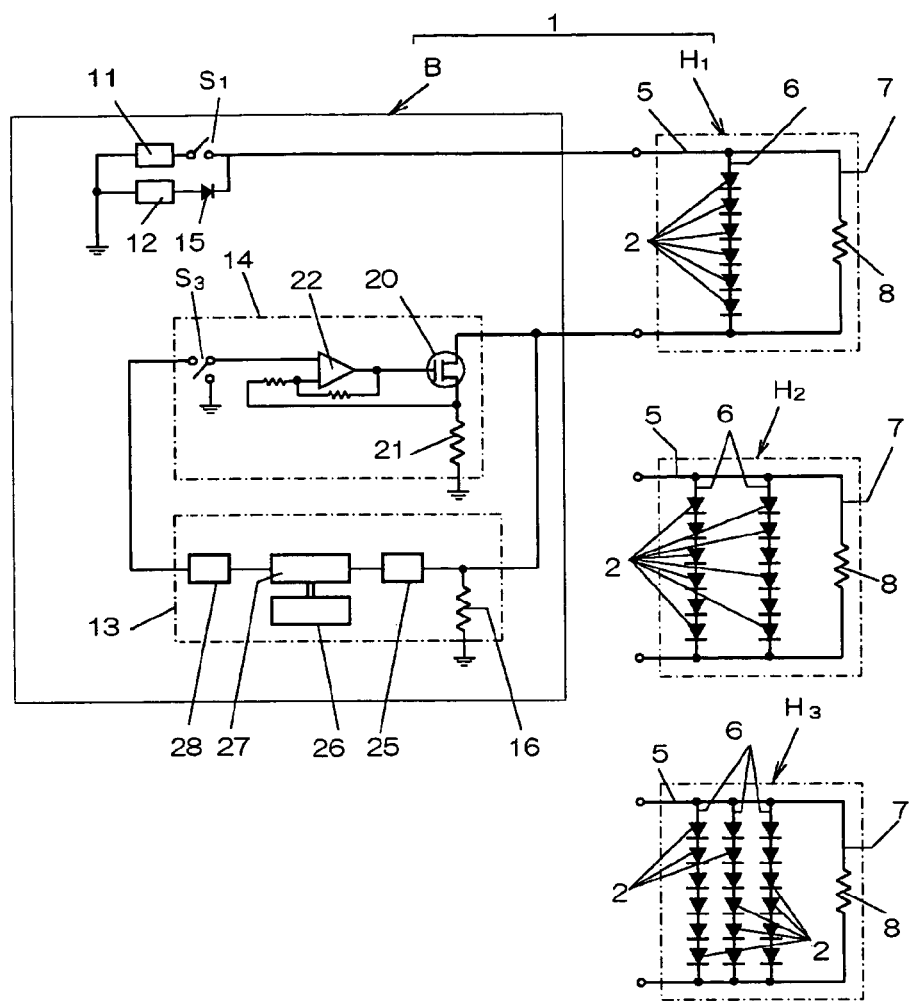
FIG. 3 is a circuit diagram showing another embodiment of the invention.
FIG. 4 is a table showing a relation between appropriate current and identification resistance.
Figure 7A:
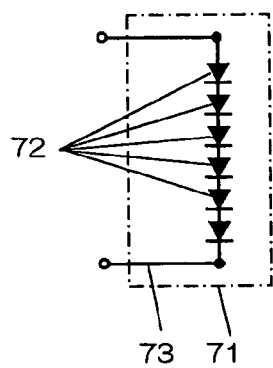
FIG. 7(a) is an explanatory view showing an existent lighting head with LEDs connected in series.
Figure 7B:
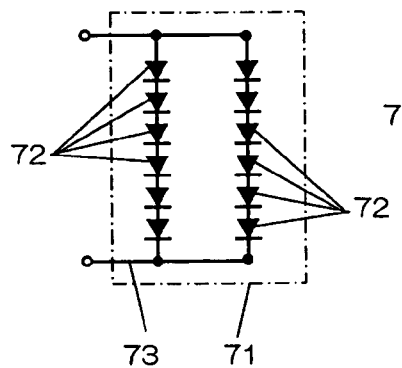
FIG. 7(b) is showing an existent lighting head with LEDs connected in parallel by two rows.
Figure 7C:
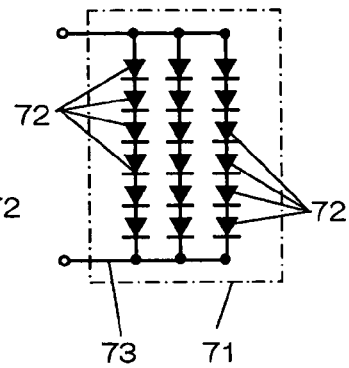
FIG. 7(c) is showing an existent lighting head with LEDs connected in parallel by three rows.

FIG. 1 is a circuit diagram showing an example of a lighting apparatus according to the present invention, FIG. 2 is a table showing a relation between appropriate current and identification resistance, and FIG. 3 is a circuit diagram showing another embodiment of the invention.

EXAMPLE 1

In a lighting apparatus 1 shown in FIG. 1, each of lighting heads $H_1$ to $H_3$ in which one or more LEDs (light emitting device) 2, 2 - - - are arranged in an optional intended pattern is connected with a power supply B.

Each of the lighting heads $H_1$ to $H_3$ has a lighting circuit 6 for connecting one or more LEDs (light emitting devices) 2, 2 - - - to a power supply circuit 5 connected with power supply terminals 3, 4 of a power supply B, and an identification circuit 7 outputs a current identification signals in accordance with an appropriate current of the lighting circuit 6, the light circuit 6 and the identification circuit 7 being connected in parallel with each other.

The number and the way of connection of LEDs 2, 2 - - - connected in the lighting circuit 6 are different on every lighting heads $H_1$ to $H_3$. That is, LED 2, 2 - - - with a rated forward current of 20 mA are connected in series by the number of six in the lighting head $H_1$, LED 2, 2 - - - connected in series by the number of six are further connected in parallel by two rows in the lighting head $H_2$, and LED 2, 2 - - - connected in series by the number of six are further connected in parallel by three rows in the lighting head $H_2$.

Accordingly, the appropriate current for the respective lighting circuits 6 is 20 mA for the lighting head $H_1$, 40 mA for the lighting head $H_2$ and 60 mA for the lighting head $H_3$. Further, an identification resistor 8 set to a resistance value of 52.8 to 3.3 kΩ is interposed in the identification circuit 7 in accordance with the appropriate current, for example, from 20 to 200 mA as shown in FIG. 2.

Since the lighting voltage vf per one red LED 2 is about 1.8 V, in a case where the LED 2, 2 - - - are connected in series by the number of six, the lower limit voltage VLmin for lighting is about 11 V, and the lighting circuit 6 is rendered conductive to light-up LEDs 2, 2 - - - when the voltage applied from the power supply B to the power supply circuit 5 is 11 V or higher. Further, when LEDs 2, 2 - - - are lit and the lighting circuit 6 is short-circuited, the identification circuit 7 is rendered non-conductive. When the voltage applied from the power supply B to the power supply circuit 5 decreases to 10 V or lower which is lower than the lower limit voltage VLmin for lighting to render the lighting circuit 6 non-conductive, since LEDs 2, 2 - - - turn OFF, the identification circuit 7 is rendered conductive, and a current identification signal is outputted in accordance with the resistance value of the identification resistor 8.

As described above, since the light circuit 6 and the identification circuit 7 are connected being in parallel with each other and connected to the power supply circuit 5 and their operation voltages are different, the circuits 6 and 7 can be operated individually in accordance with the application voltage by merely connecting them by way of the two terminals 3, 4 to the power supply B.

In the power supply B, a driving power supply 11 that supplies a lighting voltage VL at or higher than the lower limit voltage VLmin for lighting (for example, 12 V) during a lighting-up state of LEDs 2, 2 - - - and an identification power supply 12 that supplies an identification voltage VM (for example, 2.5 V) which is lower than the lower limit voltage VLmin for lighting-up the lighting circuit 6 during a not lighting-up state of LEDs 2,2 - - - are connected being in parallel with each other to the positive power terminal 3.

A current setter 13 that sets an appropriate current $I_R$ to be supplied to the lighting circuit 6 based on the current identification signal outputted from the identification circuit 7 of the lighting head $H_1$-$H_3$ and a lighting current control circuit 14 that maintains the appropriate current $I_R$ supplied to the lighting circuit 6 during the lighting-up state of the LEDs 2, 2 - - - in accordance with the current setting signal outputted from the current setter 13 are connected being in parallel with each other to the power terminal 4 on the ground side.

A switch $S_1$ is interposed between the driving power supply 11 and the terminal 3. The switch $S_1$ turns OFF in synchronization with a vertical synchronization signal of a video camera that is outputted, for example, on every 1/60 sec and remains ON in other state than described above, thereby lighting-up LEDs 2, 2 - - - during picking-up of 1 frame images.

A diode 15 is interposed between the identification power supply 12 and the terminal 3 for inhibiting the supply of the identification voltage VM from the identification power supply 12 during the ON-period of the driving power supply 11.

In the current setter 13, an identification signal detection resistor 16, for example, of 2.2 kΩ is grounded to the earth. When the current flowing through the identification resistor 8 in each of the lighting heads $H_1$ to $H_3$ is supplied to the detection resistor 16, it causes voltage drop in the detection resistor 16. An appropriate current $I_R$ to be supplied to the lighting circuit 6 is set in accordance with the current identification signal based on the detected amount of the voltage drop.

For example, in a case where the identification resistor 8 for each of the lighting heads $H_1$ to $H_3$ is selected for the identification voltage VM at 2.5 V supplied from the identification power supply 12, as shown in FIG. 2, the amount of the voltage drop Vc across the detection resistor 16 of 2.2 kΩ can be changed each by 0.1 V from 0.1 V to 1.0 V.

Accordingly, when the amount of the voltage drop is used for the current identification signal, ten levels of appropriate current can be distinguished.

A holding capacitor 17, a buffer amplifier 18, etc. are provided for outputting a current setting signal from 20 mV to 200 mV corresponding to the setting value of 20 to 200 mA of the appropriate current $I_R$ for 1/60 sec in accordance with the image pick-up time for 1 frame based on the current identification signal at 0.1 to 1.0 V.

Further, on the contrary to the switch $S_1$, since switch $S_3$ turns ON in synchronization with the vertical synchronization signal of the video camera and remains OFF in other state than described above, it stores a current identification signal in the interval from picking-up one frame images till picking-up next frame images.

The lighting current control circuit 14 controls the current flowing in the lighting circuit 6 in accordance with the current setting signal outputted from the current setter 13, in which a current detection resistor 21, for example, of 1 Ω is connected to the power supply terminal 4 on the ground side by way of an FET 20.

Then, a control signal is applied from a comparative circuit 22 to the gate of the FET 20 by a switch $S_2$ which turns OFF in synchronization with the vertical synchronization signal of the video camera and turns ON in other state than described above, like the switch $S_1$, so that the detection signal detected by the current detection resistor 21 is identical with the current setting signal outputted from the current setter 13 in a state where the power is supplied to the lighting circuit 6 and LEDs 2, 2 - - - are in the lighting-up state.

Accordingly, when an appropriate current at 20 mA, 40 mA or 60 mA is supplied to the lighting circuit 6 for each of the lighting heads $H_1$ to $H_3$, a detection signal at 20 mV, 40 mV or 60 mV is outputted by the voltage drop caused in the current detection resistor 21 which is inputted to the comparison circuit 22.

The operation of the constitution described above will be explained below.

In accordance with the appropriate current 20 mA, 40 mA, or 60 mA, in the lighting circuit 6 for each of the lighting heads $H_1$ to $H_3$, the identification resistor 8 at a resistance value of 52.8 kΩ, 25.3 kΩ, or 16.1 kΩ is interposed in the identification circuit 7 according to the table shown in FIG. 2.

Then, when a desired lighting head $H_1$ (or $H_2$ or $H_3$) is connected with the power supply B and each of the switches $S_1$ to $S_3$ is turned on and off being synchronized with the vertical synchronization signal of the video camera, the switch $S_1$ turns OFF before picking-up of one frame images, and an identification voltage VM at 2.5 V is supplied from the identification power supply 12 to one light head $H_1$ (or $H_2$ or $H_3$).

In this case, since six LEDs 2, 2 - - - connected in series are interposed between the power source terminals 3 and 4 in the lighting circuit 6 of each lighting head $H_1$ (or $H_2$ or $H_3$), the lower limit voltage VLmin for lighting for them is 11 V and the lighting circuit 6 is kept in a non-conductive state even when an identification voltage at 2.5 V is applied.

Further, in synchronization with the switch $S_1$, since the light current control circuit 14 is also rendered non-conductive by the switch S2, the current flows through the identification circuit 7 of the lighting head Hl (or $H_2$ or $H_3$) to the current setter 13 of the power supply B.

From the identification signal detection resistor 16 of the current setter 13, a current identification signal at 0.1 V (0.2 or 0.3 V) is outputted by the voltage drop caused in the identification resister in the light head $H_1$ (or $H_2$ or $H_3$) mounted to the power supply B, and the current is charged in the holding capacitor 17, and the current setting signal at 20 (40 or 60) mV corresponded to the setting value 20 (or 40, 60) mA of the appropriate current $I_R$ is continuously outputted for 1/60 sec to the lighting current control circuit 14.

Then, at the same time with the starting of picking-up one frame images, switches $S_1$ and $S_3$ turn ON and when a lighting voltage VL=12 V is supplied from the driving power supply 11, since the lighting voltage VL>lower limit voltage VLmin for lighting, the lighting circuit 6 turns ON and most of the current flows in the lighting circuit 6 and the current to the identification circuit 7 is substantially negligible.

In this case, when the current flowing in the lighting circuit 6 is higher than the appropriate current of 20 mA, a detection signal at 20 mV+α is outputted from the current detection resistor 21 of 1 Ω, which is compared with the current setting signal at 20 mV outputted from the current setter 13 to output a control signal to the FET 20 such that the detection signal lowers to 20 mV, that is, the light current flowing in the light circuit 6 is 20 mA.

In the same manner, if it is controlled to lower than the appropriate current of 20 mA, a detection signal at 20 mV −α is outputted from the current detection resistor 21 of 1 Ω, which is compared with the current setting signal at 20 mV outputted from the current setter 13, and a control signal is outputted to the FET 20 such that the detection signal is increased up to 20 mV, that is, the light current flowing in the lighting circuit 6 is controlled to 20 mA.

In a case where the lighting head $H_2$ or $H_3$ is connected, since the current setting signal at 40 or 60 mV is outputted from the current setter 13, a control signal is outputted to the FET 20 such that the light current flowing in the lighting circuit 6 is 40 or 60 mA in the same manner.

EXAMPLE 2

When it is intended that the detection signal outputted from the identification signal detection resistor 16 is in proportion with the appropriate current, since the identification resistor 8 has to be decreased substantially in an inverse proportion therewith, this restricts the selection range for the identification resistor 8.

Then, As shown in FIG. 3, the current setter 13 may comprise an A/D converter 25 for converting a detection signal outputted from the identification signal detection resistor 16 into a digital signal, a micro-computer 27 for outputting a current setting signal according to an appropriate current with reference to a detection signal—appropriate current conversion table 26, and a D/A converter 28 for converting the current setting signal into an analog signal.

Then, the current flowing in the identification resistor 8 is supplied to the detection resistor 16 in the same manner as described above, to cause voltage drop in the detection resistor 16, and an appropriate current $I_R$ to be supplied to the lighting circuit 6 in accordance with the current identification signal is set by using the detected amount of voltage drop as the current identification signal.

In a case where the identification voltage VM is 2.5 V, and the resistors value of the detection resistor 16 is 2.2 kΩ, the amount of voltage drop Vc is determined in accordance with the identification resistor 8.

Accordingly, the detection signal—appropriate current conversion table 26 is determined corresponding to the identification resistor 8, for example, as shown in FIG. 4, and an identification resistor 8 of a resistance value in accordance with the appropriate current is attached to each of the lighting heads $H_1$ to $H_3$.

EXAMPLE 3

FIG. 5 shows a further embodiment of a lighting apparatus according to the present invention in which those portions in common with FIG. 1 carry identical reference numerals for which detailed description will be omitted.

In this embodiment, a micro-computer 32 for encoding use that outputs a current identification signal formed by pulsating a current identification code different depending on the appropriate current of the light circuit 6 is connected in an identification circuit 31 of a lighting head $H_1$ (or $H_2$, or $H_3$), and a current setter 33 comprises a micro-computer 35 for decoding use that reads a current identification code from the current identification signal and sets an appropriate current with reference to an identification code—appropriate current conversion table 34.

In the identification circuit 31, a Zener diode 37 with a Zener voltage at 3 V is disposed to a switching circuit 36. Since the switching circuit 36 is rendered conductive when a voltage of 3 V or higher is applied by way of the power supply terminal 3 and 4 to turn the transistor 38 to on, a reset signal is inputted to the micro-computer 32 for encoding use to turn the micro-computer 32 to an OFF state.

Further, when a voltage at 3 V or lower is applied, since the switching circuit 36 is rendered non-conductive, the current is supplied by way of the power supply circuit 39 to the micro-computer 32, and a transistor 40 turns ON and OFF by the pulse signal in accordance with a predetermined current identification code, and a pulsated current identification signal is outputted.

The current identification signal inputted to a current setter 33 is inputted to a micro-computer 35 for decoding use, which reads a current identification code from the pulse signal to output a current setting signal with reference to the identification code—appropriate current conversion table 34.

The identification code is not restricted only to the appropriate current so long as it corresponds to the appropriate current and, for example, it may be a model number for lighting heads ($H_1$ to $H_3$) such as H1234, H2468, and H3471.

In this case, when appropriate currents corresponding to the model numbers are previously registered in the identification code—appropriate current conversion table 34, appropriate current corresponding to the light head $H_1$ to $H_3$ can be read out.

As has been described above, according to the invention, a current identification signal is outputted in accordance with the appropriate current from the lighting head in a state while the light emitting devices in each of the lighting heads are not in the lighting-up state, and the current supply to the lighting circuit can be maintained at an appropriate current in accordance with the current identification signal. Accordingly, this can provide an excellent effect capable of lighting-up the individual light emitting devices connected in the lighting circuit at a rate current irrespective of the specification of the lighting heads.

In accordance with the present invention, since the current supplied from the current supply can automatically be kept at an appropriate current and the light emitting devices can always be in a lighting-up state at the rated current irrespective of the specification of the lighting head, it is suitable to the application use in which lighting heads of different appropriate currents can optionally be attached selectively to the power supply and used.

The present disclosure relates to subject matter contained in priority Japanese Patent Application No. 2003-323,991 filed on Sep. 17, 2003, the contents of which is herein expressly incorporated by reference in its entirety.

What is claimed is:

1. A method of connecting a lighting head to a power supply and lighting-up the lighting head, the lighting head having a lighter in which at least one light emitting device is connected, comprising:

outputting a current identification signal from the lighting head that indicates a current value to supply to the lighter during a state in which the at least one light emitting device of the lighter is not lit, the current identification signal depending on an arrangement of the at least one light emitting device;

supplying a current to the lighter having the indicated current value; and maintaining the current supplied to the lighter at the indicated current value during a state in which the at least one light emitting device is lit.

2. The method according to claim 1, further comprising determining a rated current of the lighting head from the current identification signal, wherein the indicated current value comprises the rated current of the lighting head.

3. A lighting apparatus, comprising:

a lighting head, comprising:

a lighter that supplies a current to at least one light emitting device when an application voltage supplied to the lighter is at least equal to a lower limit voltage for lighting, the lower limit voltage depending on an arrangement of the at least one light emitting device; and an identifier that outputs a current identification signal that indicates a current value to supply to the lighter when the application voltage is lower than the lower limit voltage; and a power supply, comprising:

a driving power supply that supplies a lighting voltage at least equal to the lower limit voltage to the lighter during a state in which the at least one light emitting device is lit;

an identification power supply that supplies an identification voltage lower than the lower limit voltage to the identifier during a state in which the at least one light emitting device is not lit;

a current setter that sets a current supplied to the lighter to the indicated current value; and a lighting current controller that maintains the current supplied to the lighter at the indicated current value during a state in which the at least one light emitting device is lit.

4. A lighting apparatus according to claim 3, wherein the lighter and the identifier in the lighting head are connected in parallel with each other and to the power supply via power supply terminals of the power supply.

5. A lighting apparatus according to claim 4, wherein the identifier comprises an identification resistor having a resistance value relating to the indicated current value and the current setter outputs a current setting signal in accordance with current that flows through the identification resistor.

6. A lighting apparatus according to claim 5, wherein the current setter comprises a micro-computer that sets a current based on the current identification signal by referring to a conversion table.

7. A lighting apparatus according to claim 4, wherein the current setter comprises a micro-computer that sets a current based on the current identification signal by referring to a conversion table.

8. A lighting apparatus according to claim 4, wherein the identifier comprises a micro-computer for encoding use that outputs a current identification signal formed by pulsating a current identification code corresponding to a current value to supply to the lighter, and the current setter comprises a micro-computer for decoding use that reads the current identification code from the current identification signal and sets a current corresponding to the current identification by referring to a conversion table.

9. A lighting apparatus according to claim 3, wherein the identifier comprises an identification resistor having a resistance value relating to the indicated current value and the current setter outputs a current setting signal in accordance with current that flows through the identification resistor.

10. A lighting apparatus according to claim 9, wherein the current setter comprises a micro-computer that sets a current based on the current identification signal by referring to a conversion table.

11. A lighting apparatus according to claim 3, wherein the current setter comprises a micro-computer that sets a current based on the current identification signal by referring to a conversion table.

12. A lighting apparatus according to claim 3, wherein the identification circuit comprises a micro-computer for encoding use that outputs a current identification signal formed by pulsating a current identification code corresponding to a current value to supply to the lighter, and the current setter comprises a micro-computer for decoding use that reads a current identification code from the current identification signal and sets a current corresponding to the current identification by referring to a conversion table.

13. The lighting apparatus according to claim 3, wherein the current setter determines a rated current of the lighting head from the current identification signal, and the indicated current value comprises the rated current of the lighting head.

14. The lighting apparatus according to claim 3, wherein current flows through the identifier only when current does not flow through the lighter.

15. A lighting head having at least one light emitting device arranged therein and configured to connect to a power supply, comprising:

a lighter that conducts when an application voltage supplied to the lighter is at least equal to a lower limit voltage for lighting and supplies a current to the at least one light emitting device, the lower limit voltage for lighting depending on an arrangement of the at least one light emitting device; and an identifier that conducts when the application voltage supplied to the lighter is lower than the lower limit voltage and outputs a current identification signal that indicates a current value to supply to the lighter.

16. The lighting head according to claim 15, wherein the current identification signal enables a power supply to determine a rated current of the lighting head, and the indicated current value comprises the rated current of the lighting head.

17. The lighting head according to claim 15, wherein the lighter and the identifier are connected in parallel with each other and are configured to connect in parallel to a power supply via power supply terminals.

18. The lighting head according to claim 15, wherein current flows through the identifier only when current does not flow through the lighter.

19. A power supply that connects to a lighting head having at least one light emitting device arranged therein and having a lighter that supplies a current to the at least one light emitting device when an application voltage supplied to the lighter is at least equal to a lower limit voltage for lighting which depends on an arrangement of the at least one light emitting device and an identifier that outputs a current identification signal that indicates a current value to supply to the lighter when the application voltage applied to the lighter is lower than the lower limit voltage, comprising:

a driving power source that supplies a lighting voltage at least equal to the lower limit voltage to the lighter during a state in which the at least one light emitting device is lit;

an identification power supply that supplies an identification voltage lower than the lower limit voltage to the identifier during a state in which the at least one light emitting device is not lit;

a current setter that sets a current supplied to the lighter to the indicated current value; and a lighting current controller that maintains the current supplied to the lighter at the indicated current value during a state in which the at least one light emitting device is lit.

20. The power supply according to claim 19, wherein the current setter determines a rated current of the lighting head from the current identification signal, and the indicated current value comprises the rated current of the lighting head.

* * * * *